United States Patent
Johansson

(10) Patent No.: US 10,437,449 B2
(45) Date of Patent: *Oct. 8, 2019

(54) METHOD FOR APPLICATION LAUNCH AND SYSTEM FUNCTION INVOCATION

(71) Applicant: BlackBerry Limited, Waterloo (CA)

(72) Inventor: Karl-Anders Johansson, Staffanstorp (SE)

(73) Assignee: BlackBerry Limited, Waterloo, Ontario (CA)

( * ) Notice: Subject to any disclaimer, the term of this patent is extended or adjusted under 35 U.S.C. 154(b) by 709 days.

This patent is subject to a terminal disclaimer.

(21) Appl. No.: 14/804,133

(22) Filed: Jul. 20, 2015

(65) Prior Publication Data
US 2015/0324110 A1    Nov. 12, 2015

Related U.S. Application Data

(63) Continuation of application No. 13/122,849, filed as application No. PCT/EP2009/062682 on Sep. 30, 2009, now Pat. No. 9,086,799.

(60) Provisional application No. 61/102,892, filed on Oct. 6, 2008.

(51) Int. Cl.
*G06F 3/0488* (2013.01)
*G06F 3/0484* (2013.01)

(52) U.S. Cl.
CPC ...... *G06F 3/04847* (2013.01); *G06F 3/04883* (2013.01)

(58) Field of Classification Search
CPC .............................. G06F 3/041; G06F 3/04883
USPC .......................................................... 345/173
See application file for complete search history.

(56) References Cited

U.S. PATENT DOCUMENTS

| | | | |
|---|---|---|---|
| 5,805,167 A | 9/1998 | van Cryningen | |
| 2001/0011979 A1 | 8/2001 | Hasegawa et al. | |
| 2006/0092177 A1 | 5/2006 | Blasko | |
| 2007/0150842 A1* | 6/2007 | Chaudhri ............ | G06F 3/04883 715/863 |
| 2008/0115060 A1* | 5/2008 | Mosko ................. | G06F 3/0482 715/702 |
| 2008/0174570 A1 | 7/2008 | Jobs et al. | |
| 2009/0006991 A1 | 1/2009 | Lindberg et al. | |
| 2009/0284482 A1* | 11/2009 | Chin ................... | G06F 3/04883 345/173 |

OTHER PUBLICATIONS

T-Mobile. G1 User Guide, Sep. 12, 2008; p. 143PP, XP007917079, retrievd from http://issuu.com/dhpss/docs/tm30234 [retrieved on Feb. 9, 2011] pp. 1, 15, 17, 18.

International Search report and Writtion Opinion dated Feb. 28, 2011 in corresponding PCT application No. PCT/EP2009/062682.

International Preliminary report on Patentability and Written Opinion dated Apr. 12, 2011 in corresponding PCT application No. PCT/EP2009/062682.

(Continued)

*Primary Examiner* — Towfiq Elahi
(74) *Attorney, Agent, or Firm* — Fish & Richardson P.C.

(57) ABSTRACT

The system comprises the ability to detect certain gestures made by sliding a finger or stylus on a touch sensitive screen on a handheld device, even when a so called "screen lock" is active where the gesture is used to unlock the device and trigger the desired function associates with the gesture.

27 Claims, 21 Drawing Sheets

(56) References Cited

OTHER PUBLICATIONS

Figure 1:
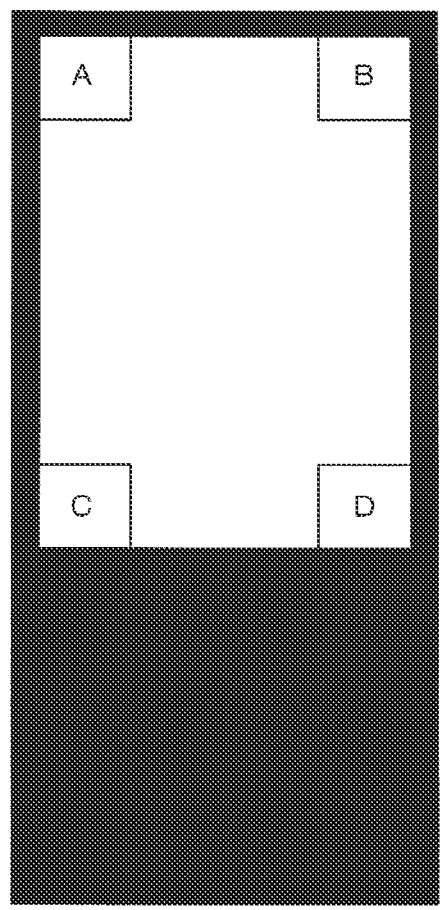

Invitation Pursuant to Article 94(3) and Rule 71(1) EPC issued in European Application No. 09783595.3 on Nov. 30, 2017; 5 pages.
Communication Pursuant to Article 94(3) EPC issued in European Application No. 09783595.3 dated Feb. 23, 2017.
Communication under Rule 71(3) EPC issued in European Application No. 09783595.3 dated Nov. 15, 2018, 42 pages.

* cited by examiner

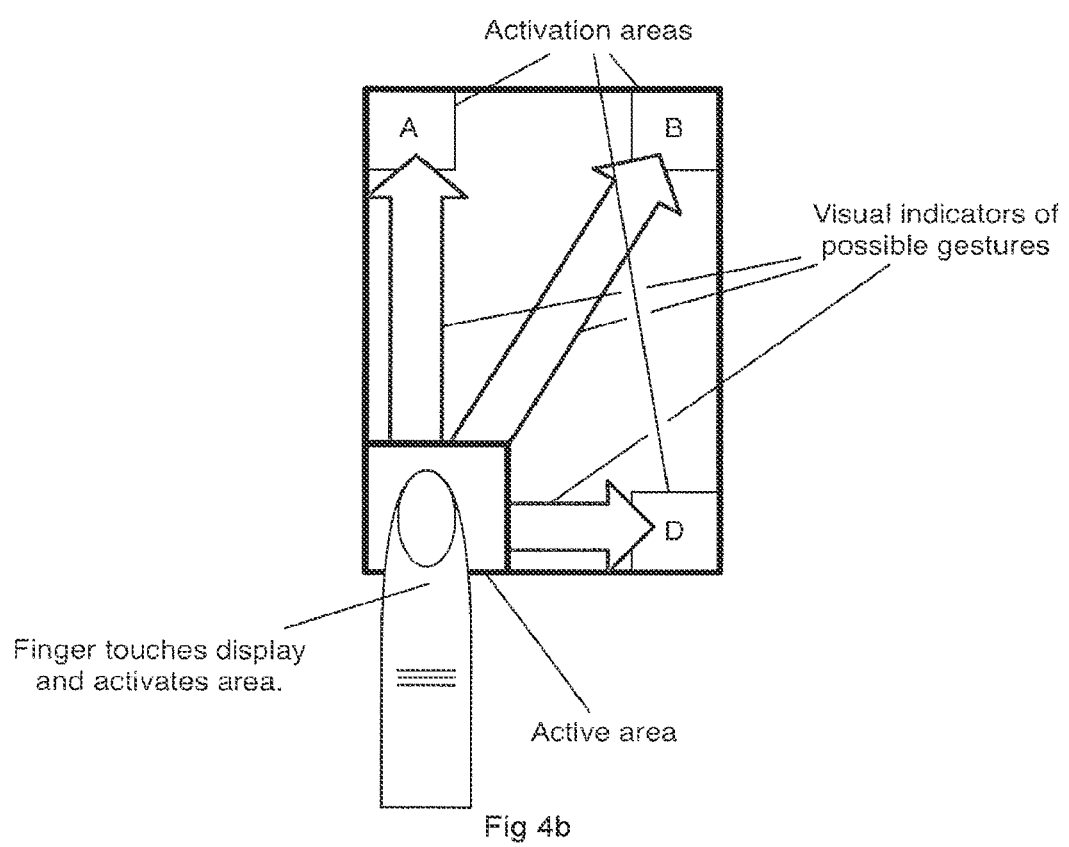

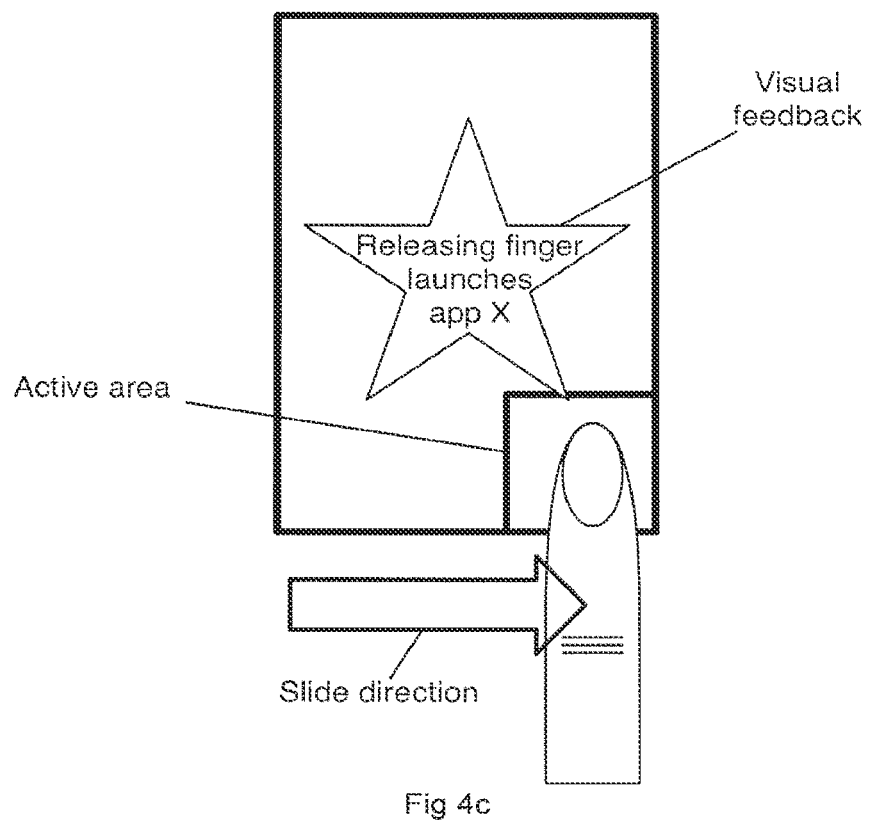

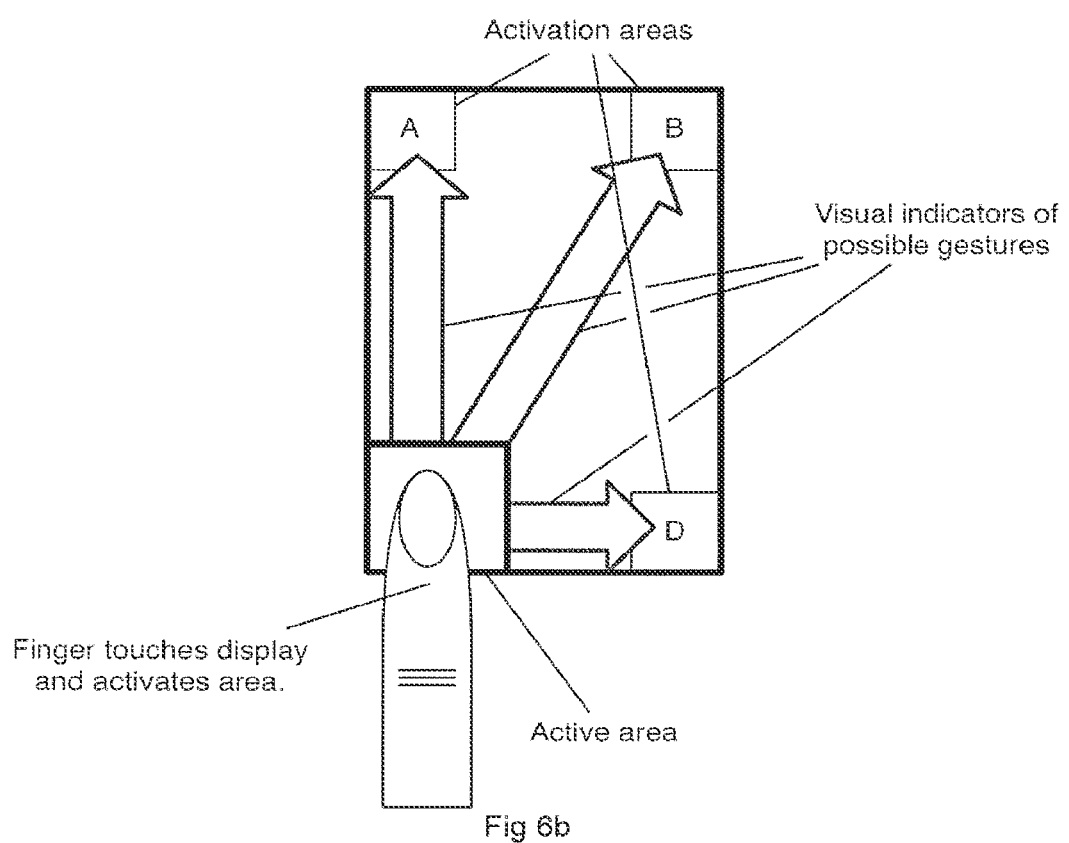

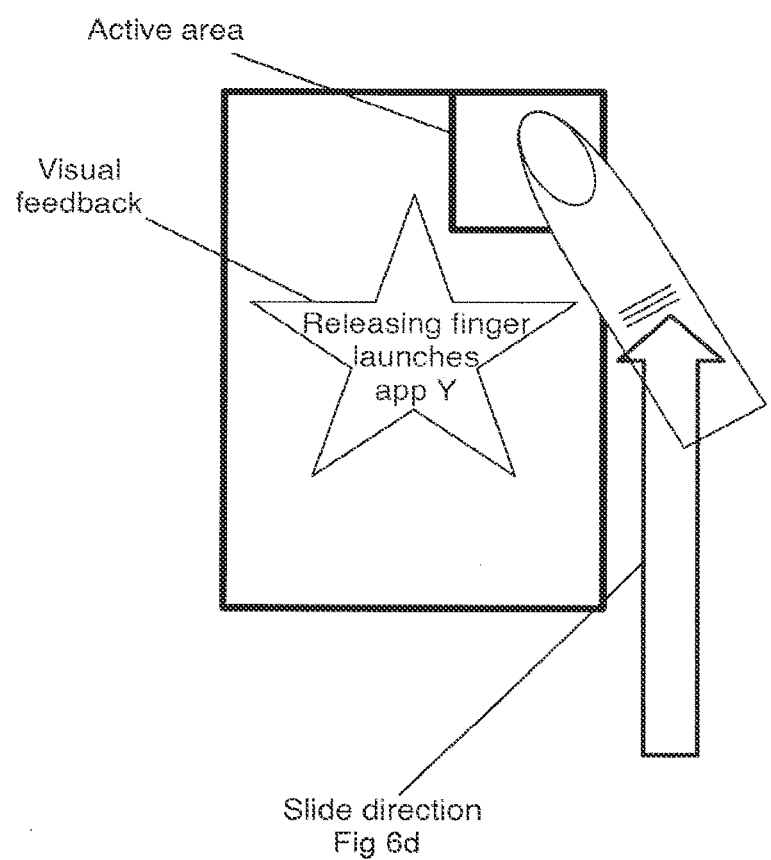

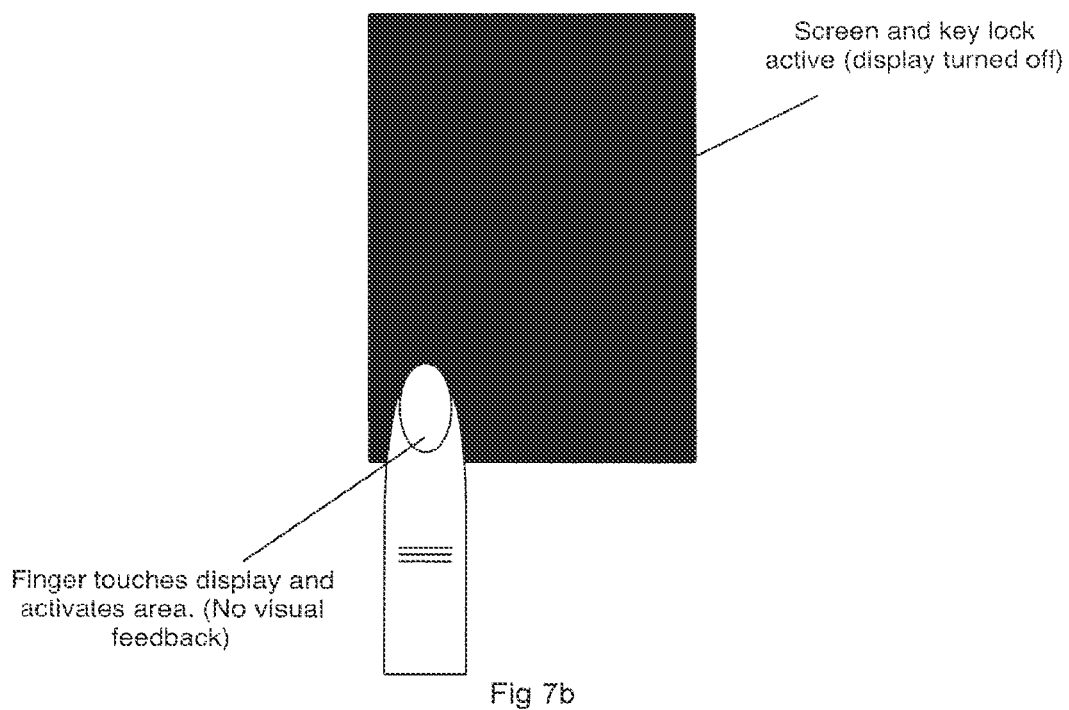

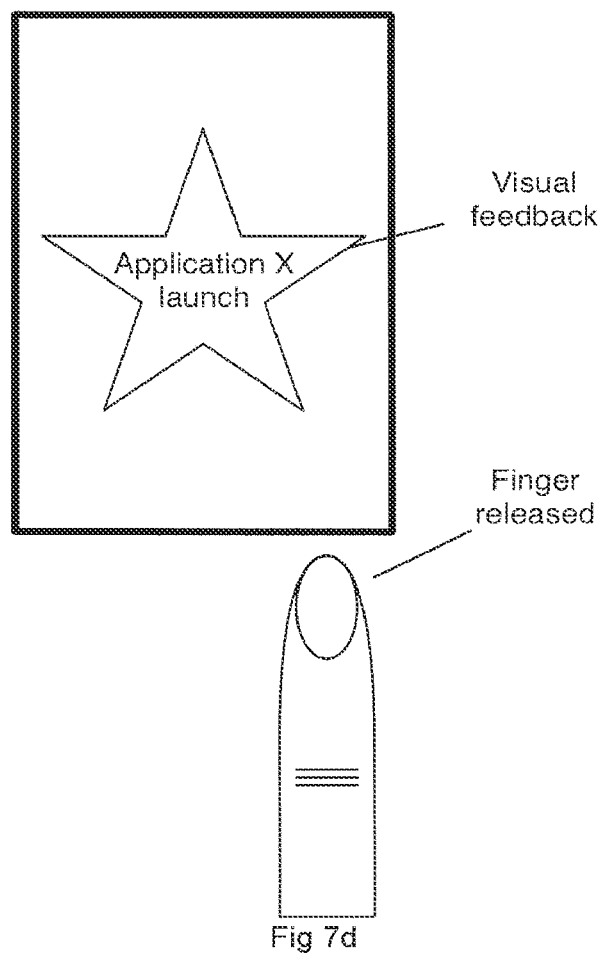

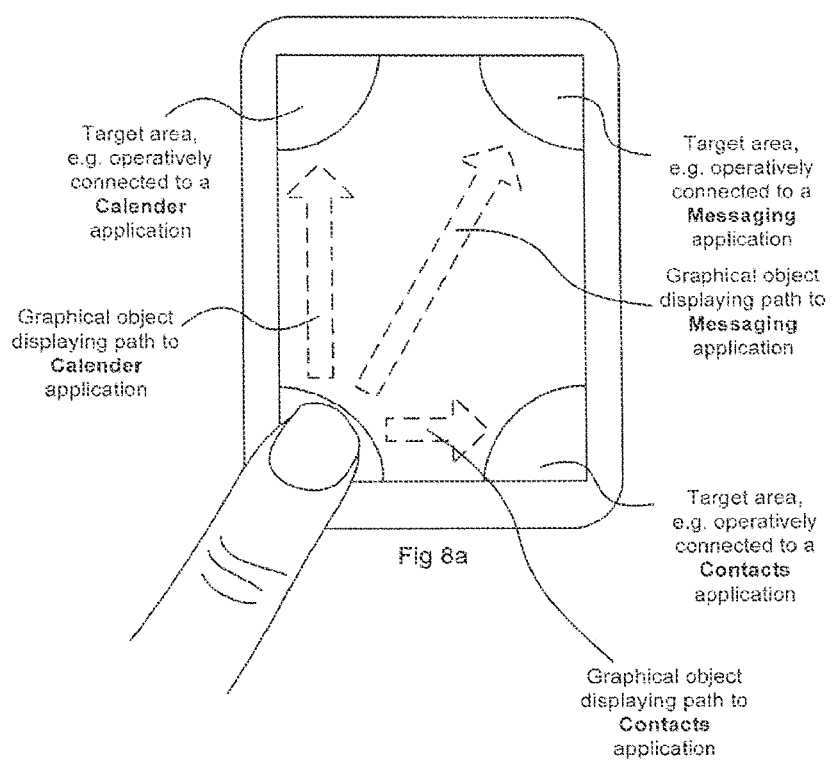

METHOD FOR APPLICATION LAUNCH AND SYSTEM FUNCTION INVOCATION

This application is a continuation of and claims priority to U.S. patent application Ser. No. 13/122,849, filed on Sep. 5, 2011, which is a National Stage Entry of International Application No. PCT/EP2009/062682, filed on Sep. 30, 2009, which claims priority to U.S. Provisional Application No. 61/102,892, filed on Oct. 6, 2008, the entire contents of which are hereby incorporated by reference.

BACKGROUND

This invention combines two previously unrelated areas, namely screen- and keyboard unlocking mechanisms and application launch systems, which are here described separately.

Traditionally and typically, screen- and keyboard unlocking mechanisms on mobile/handheld devices involve multiple key presses or a combination of key presses and touch screen gestures to prevent spurious unlocks that would occur if only one action was necessary. Note that several devices on the market today actually a single key press on a special key to unlock the device (e.g. a Camera button). This special key can easily be pressed by mistake when the device is placed in a pocket or a bag.

These systems all suffer from the fact that extra actions are needed to start using the device and access the functionality and/or applications on the device if the user already knows what she wants to access.

Application launch and access to certain system functions sometimes need to be very quick. Typical ways of starting applications on a mobile/handheld device involve navigating a menu system. The number of key presses or gestures vary immensely from device to device and from manufacturer to manufacturer, and in some cases the devices even have dedicated hardware buttons that trigger the start of certain applications. Note that the latter tend to suffer from the spurious device unlocks described in the paragraph above.

The fewest number of actions needed to start an application after the device has been safely unlocked is however in the best case 1 (one), and that is in the case of having a direct shortcut to the application from the screen that is shown after the device is unlocked.

Many application launch systems—especially those running on devices with only touch sensitive screens as main input—require the user to look on the screen when navigating the menu structure or using the direct shortcuts available. Even worse is the situation on devices where layout is dynamic and a certain application launch command is located on different positions on different occasions.

BRIEF LIST OF FIGURES

FIG. 1. One possible embodiment of invention; a device with touch sensitive screen with four activation areas.

Figure 2:
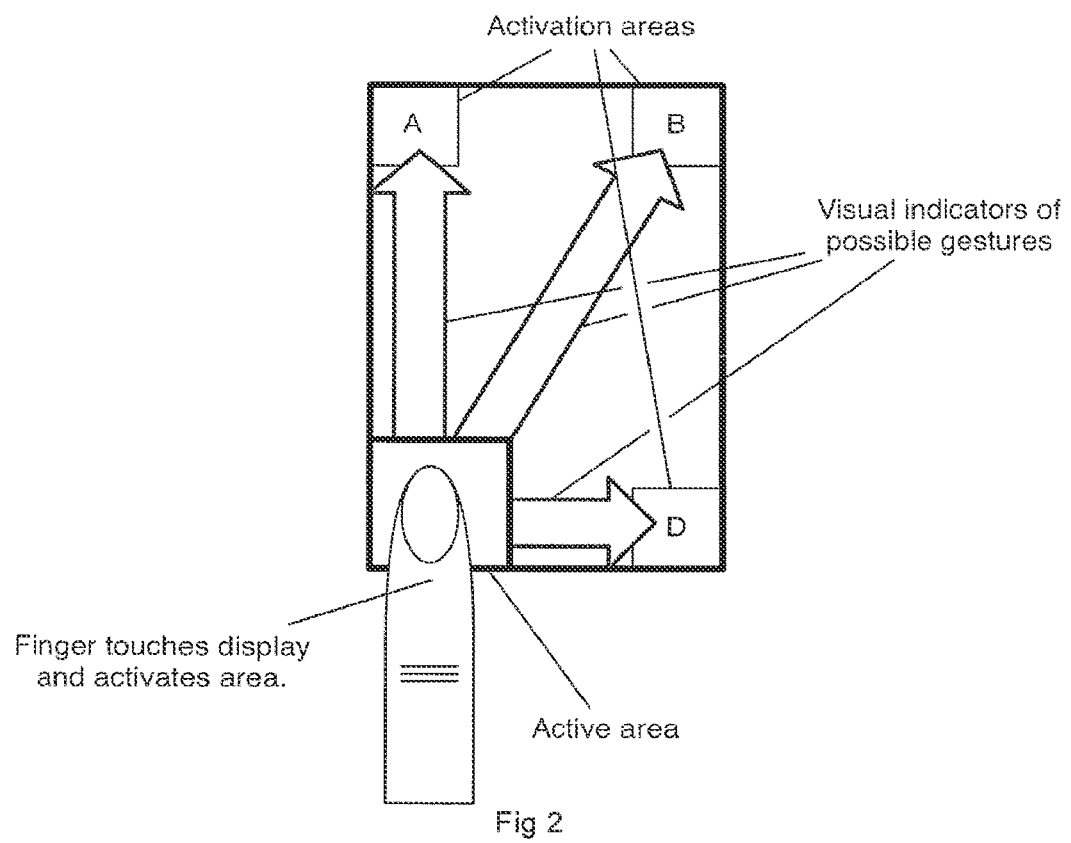

FIG. 2. When touching an activation area, the available choices are shown in the other activation areas.

Figure 3:
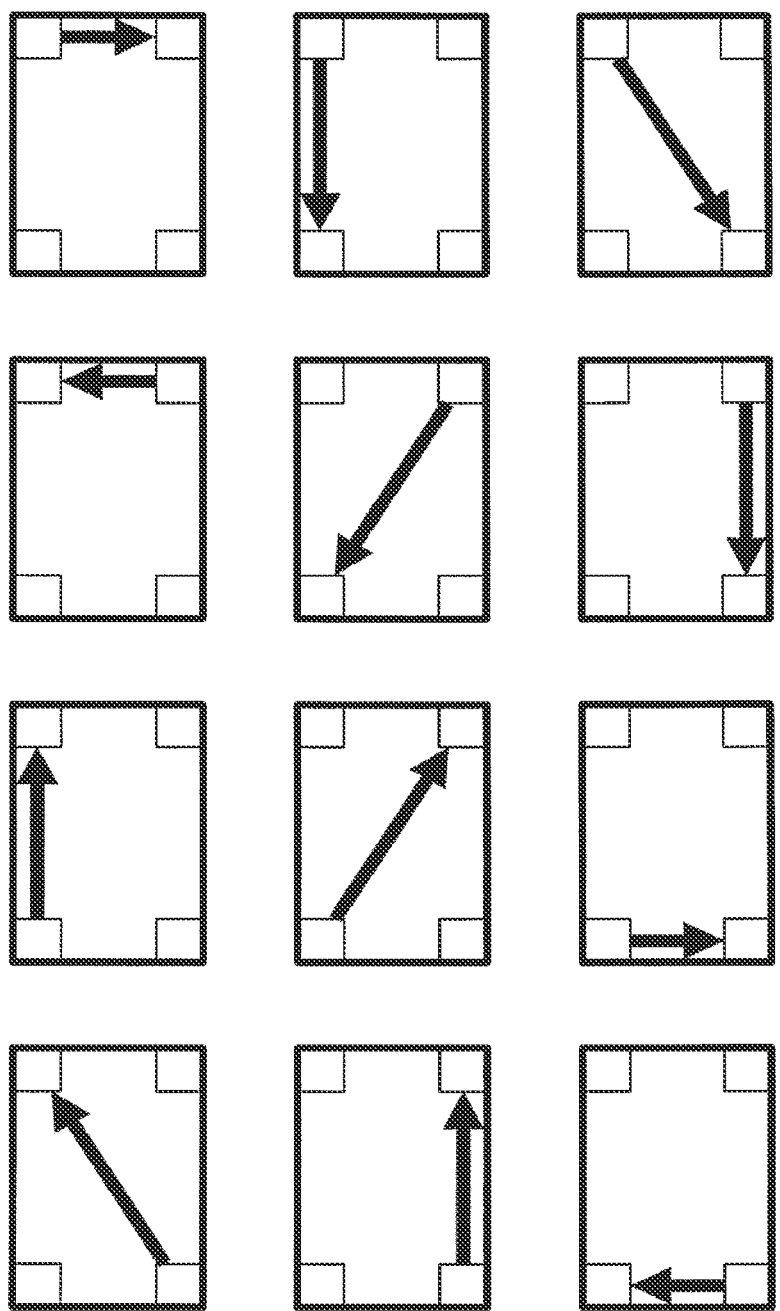

FIG. 3. All possible single slide gestures available when the four corners are used as activation areas.

FIG. 4a-d. Demonstrating a single slide gesture from activation zone C to D

Figure 5:
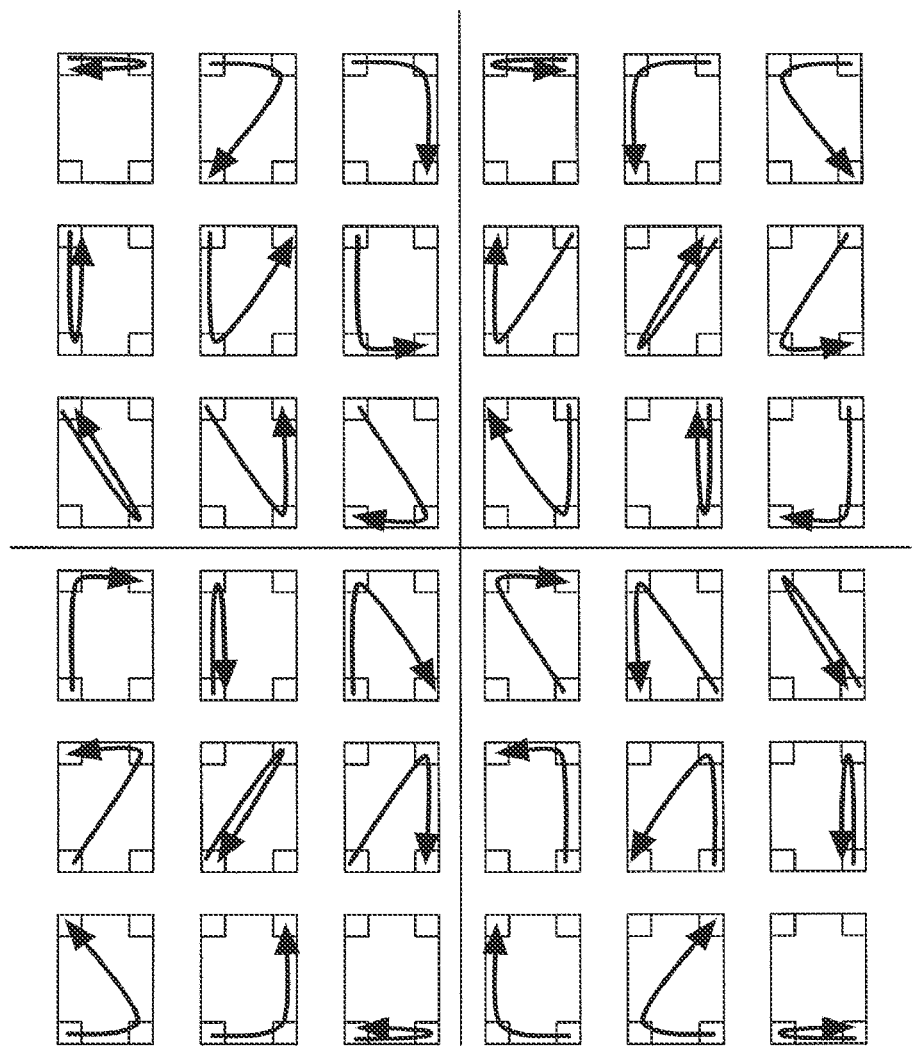

FIG. 5. All possible two-slide gestures available when the four corners are used as activation zones.

FIG. 6.a-e Demonstrating a multi slide gesture from C to D to B

FIG. 7a-d. Demonstrating unlocking the device and launching an application using a single slide gesture from activation zone C to D.

FIG. 8a-d. Demonstrating a single slide gesture by example of launching the Calendar application.

DETAILED DESCRIPTION OF THE INVENTION

The present invention combines the two previously unrelated areas of screen- and keyboard unlocking mechanisms and application launch systems.

Further, the invention utilizes the physically distinguishable areas, such as corners of the screen, which is advantageous since these are easy to recognize by a user without looking at the screen. By utilizing the physically distinguishable areas it is possible for a user to rely on muscle memory which is positive from a user experience perspective. Therefore, the problem that there is little or no possibility to "feel" where virtual buttons and selection areas are represented is solved.

Starting with application launch, the intention is to bring the simplicity and ease-of-use of non-touch screen devices to touch screen devices. As described in the "background" section, touch screen devices typically suffer from not encouraging or allowing the user to learn how to start applications and access system functions using muscle memory.

The invention introduces a set of restricted gestures that allow the user to perform them without looking at the screen. This is achieved by designing gestures that start, go through and end at certain activation areas on the screen that are easy to feel with the fingers. Throughout the text and figures of this document we use the four corners of the touch sensitive screen as activation areas for simplicity and clarity since these are especially easy to feel with the finger, but the technique is easily extendable to more or other areas if the physical embodiment of the device encourage other areas of the screens to be used instead of or in addition to the corners.

Note that applications and system functions are activated through slides between different activation areas and not by simply touching/pressing the activation areas.

The simplest form of slide gesture is the Single Slide Gesture, which goes from one activation area to another. All possible Single Slide Gestures using four activation areas are shown in FIG. 3. There are 12 possible Single Slide Gestures using four corners.

Figure 4A:
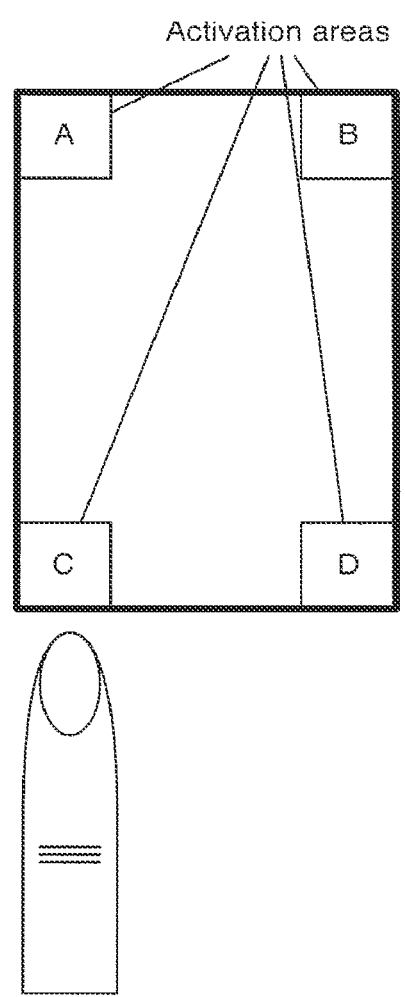
Figure 4D:
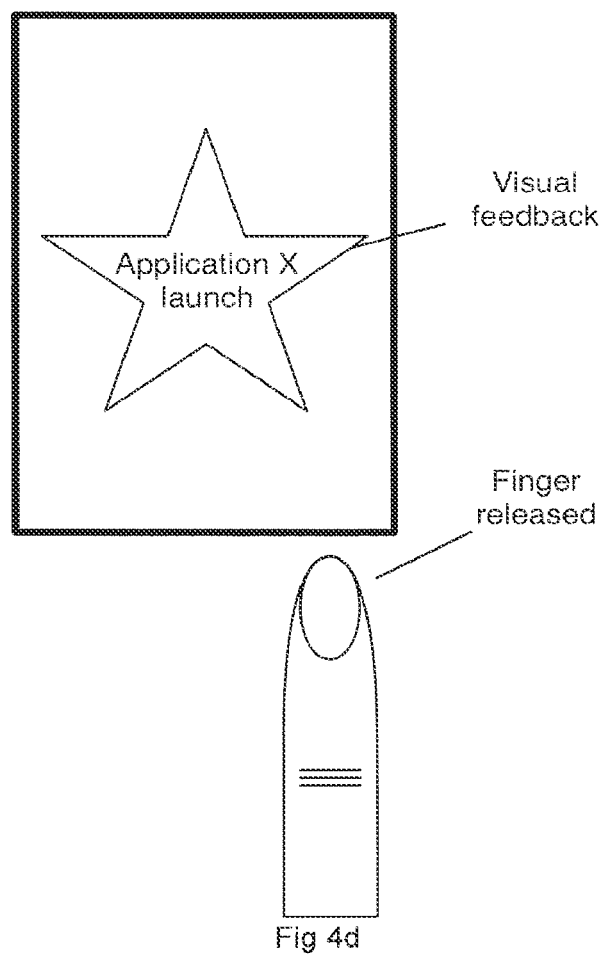

FIG. 4 illustrates the use case of launching an application using a single slide gesture. In FIG. 4a the graphical representations of the activation areas prompt the user to touch one activation area. FIG. 4b illustrate that when one of them is touched there is a visual prompt to slide the finger to another activation area. FIG. 4c illustrate when the finger has reached the destination activation area where visual feedback is given informing the user that by releasing the finger, the application will be launched [or system function invoked]. And finally in FIG. 4d, the finger is released and visual feedback is given in the form of the launching application [or equivalent].

The Multi Slide Gesture is a gesture where more slides are used to describe the gesture. Still, only slides between activation areas are used. All possible slides using two slides ("Two Slide Gestures") using four activation areas are shown in FIG. 5. There are 36 possible Two Slide Gestures using four activation areas. The generic formula for calculating the number of N-Slide Gestures for M activation areas is $M*(M-1)^N$.

Figure 6A:
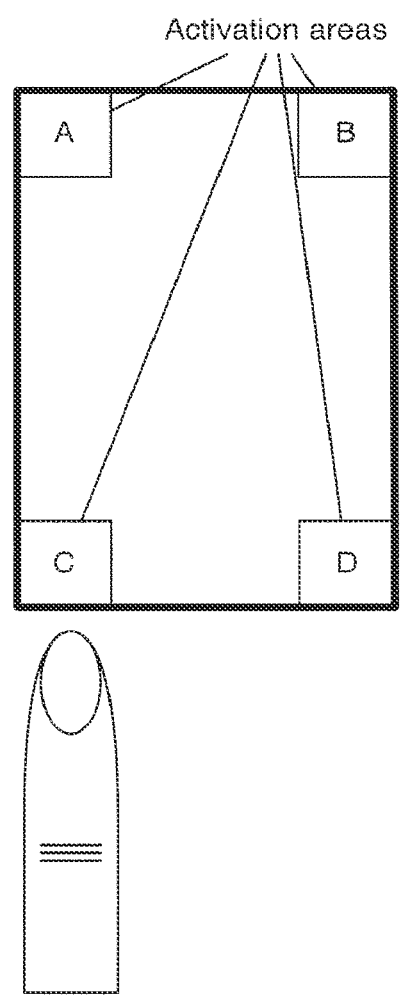
Figure 6C:
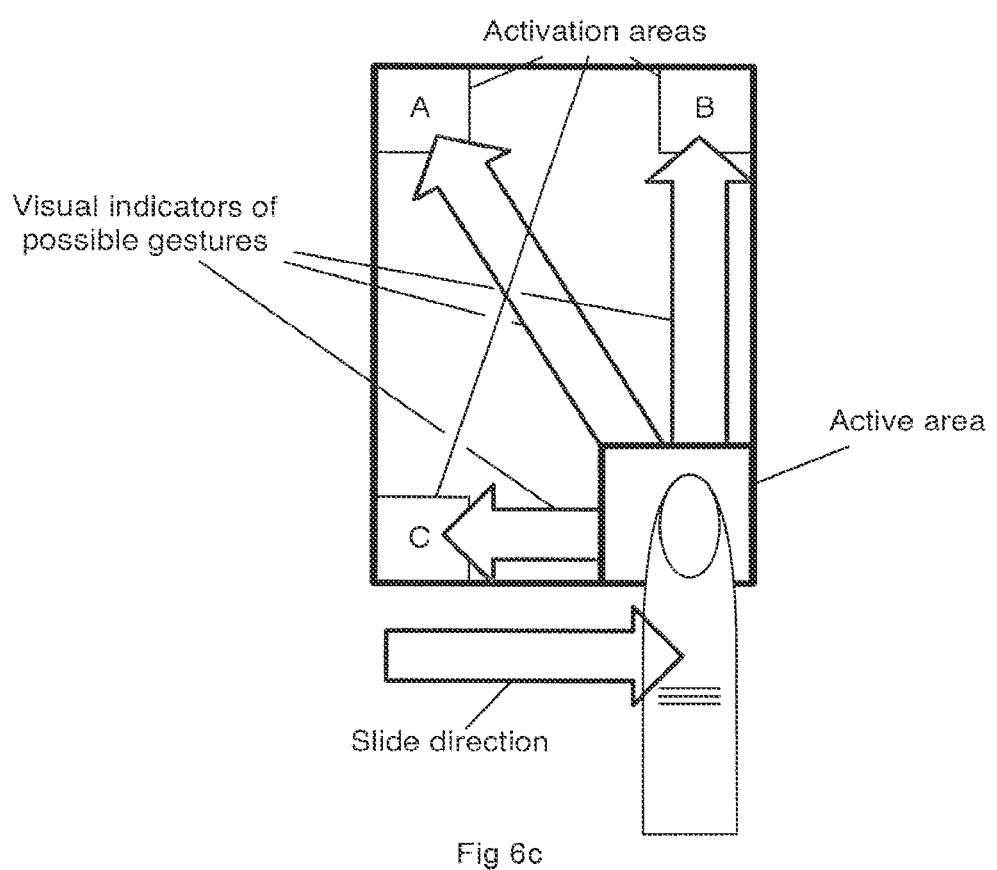
Figure 6E:
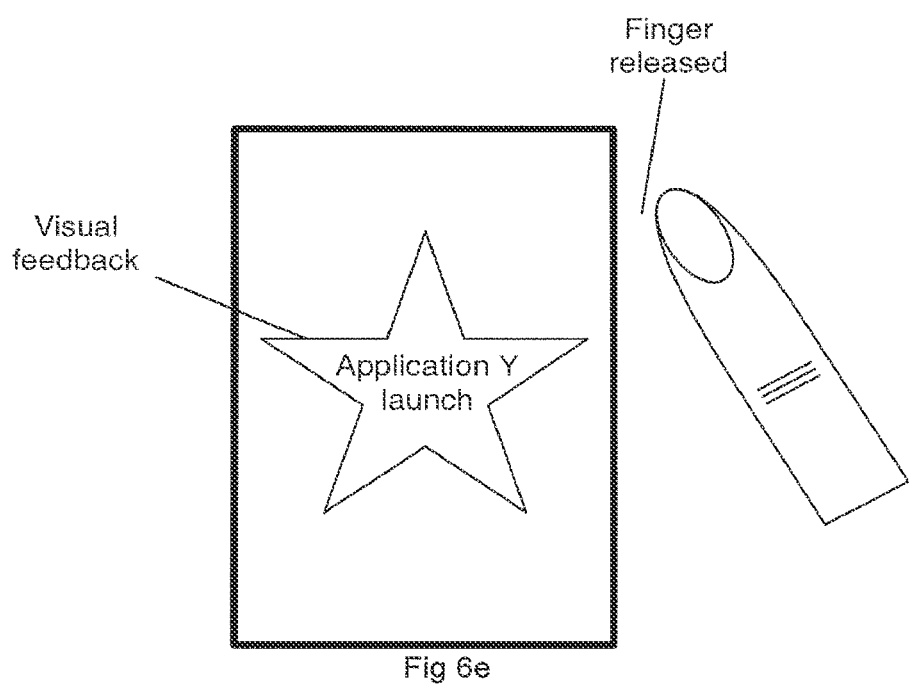

FIG. 6 illustrates the use case of launching an application using a Two Slide Gesture. In FIG. 6a the graphical representations of the activation areas prompt the user to touch one activation area. FIG. 6b illustrate that when one of them is touched there is a visual prompt to slide the finger to another activation area. FIG. 6c illustrate that the gesture must be continued by sliding the finger to another activation area. FIG. 6d illustrate having reached the destination activation area and visual feedback is given informing the user that by releasing the finger, the application will be launched [or system function invoked]. And finally in FIG. 6e, the finger is released and visual feedback is given in the form of the launching application [or equivalent].

This technique for identifying gestures is very robust from a system perspective and from an end user's perspective there are obvious gains in form of muscle memory utilization and implicit tactile feedback.

Figure 7A:
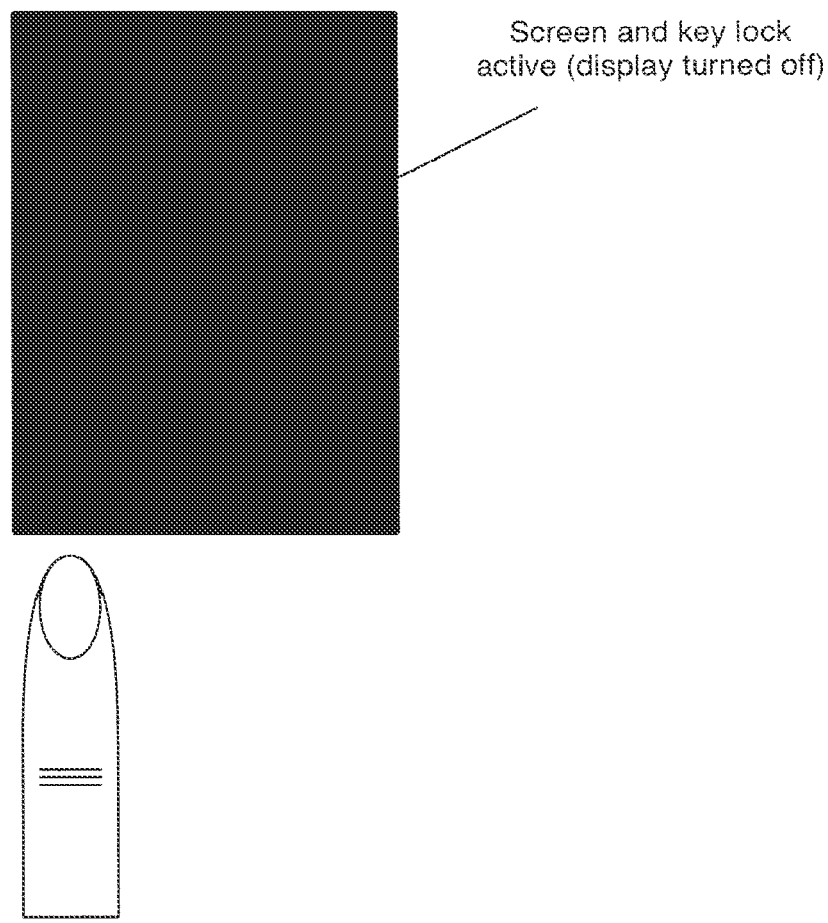
Figure 7C:
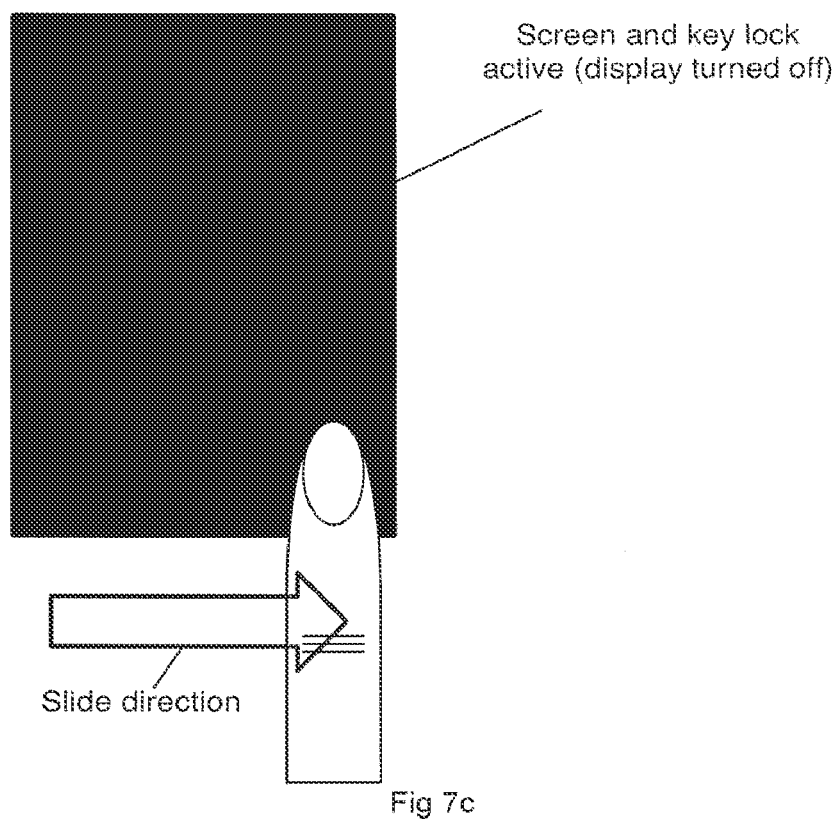

Yet another important aspect of the Invention remains though, which will become clear when observing FIG. 7. In FIG. 7a, the device's screen- and key lock is activated, meaning that the screen is turned off or in power save mode. However, the touch sensors are still active and looking for finger touches. In FIG. 7b, a finger in an activation area has been detected, but no visual or other feedback is given to the user. In FIG. 7c the finger has entered another activation area and still no feedback is given to the user. Not until in FIG. 7d does something happen, and that is unlocking the screen- and key lock as well as launching an application as the result of the Single Slide Gesture from activation area C to D. Note that this is the exact same gesture as in the first example illustrated in FIG. 4, and repeated here it gives the exact same result.

Note how the combination of the touch screen unlock mechanism and application launch system has reduced the number of actions on the end user's part substantially. The time required for accessing applications and system functions can thus be drastically lowered, increasing the ease-of-use for the end user.

Figure 8B:
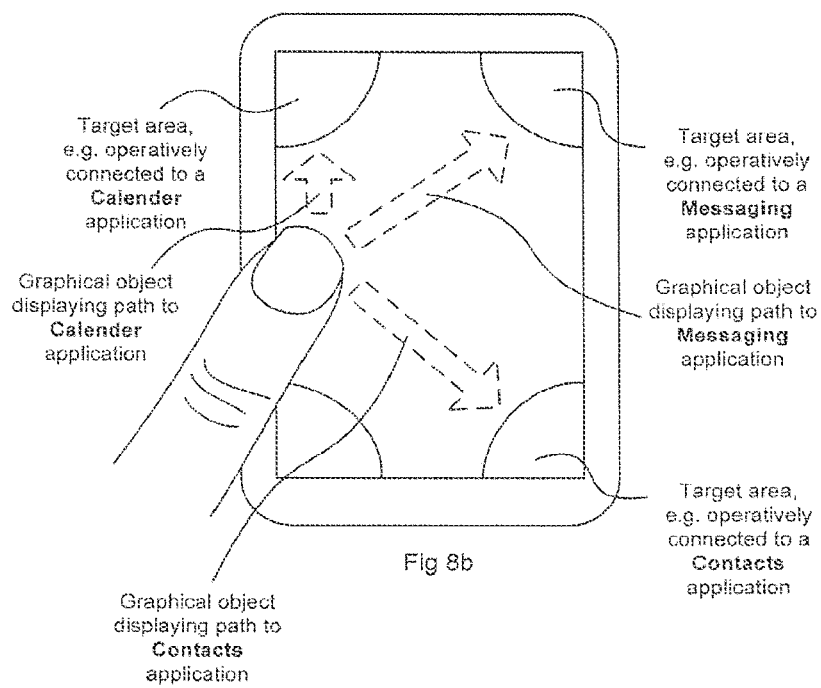
Figure 8C:
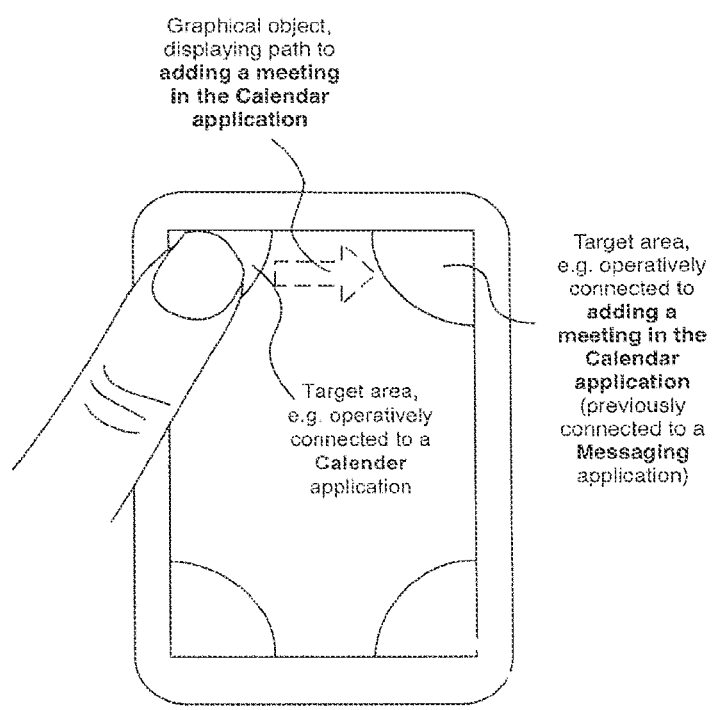
Figure 8D:
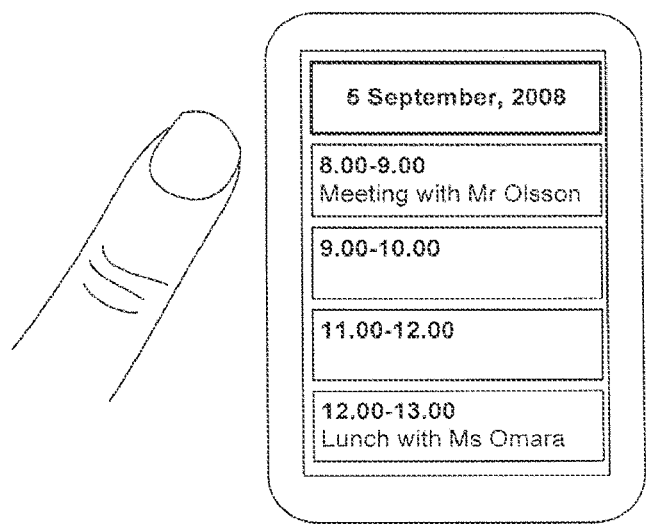

In FIG. 8, a concrete use case is shown. In FIG. 8a, the user touches an area that brings up three sub-choices; Launch Calendar, launch Messaging and launch Contacts. Graphical objects (arrows) are shown to indicate where to slide fingers in order to make a choice. In FIG. 8b, the user slides his finger through the intermediary area and the graphical indicator objects are updated to reflect in which directions the various choices are. In FIG. 8c, the finger has reached the target area and two things happen: 1) Another area is activated as a sub-choice (or sub-menu if you will) and 2) the current area is made to trigger on releasing the user's finger. In FIG. 8d, the user releases his finger instead of sliding to the next area and thus the calendar application (the first choice) is launched. This example demonstrated that Single- and Multi Slide Gestures are allowed to share a common start. The activation does not occur until the finger is released.

The invention claimed is:

1. A method, comprising:
 displaying, on a touch screen of an electronic device, a plurality of target areas, wherein each of the plurality of target areas corresponds to a different application;
 detecting, using the touch screen of the electronic device, a slide gesture from a start area to one target area among the plurality of target areas, wherein the slide gesture is in a vertical, a horizontal, or a diagonal direction;
 while the touch screen is locked, in response to detecting that the slide gesture reaches to the one target area, displaying a graphical object on the touch screen that indicates a location of a sub-choice target area on the touch screen, wherein the sub-choice target area is associated with a sub-choice representing a specific action or operation within the application corresponding to the one target area;
 when the slide gesture releases on the target area:
  unlocking the touch screen; and
  launching the application corresponding to the one target area;
 when the slide gesture continues to and releases on the sub-choice target area:
  unlocking the touch screen;
  launching the application corresponding to the one target area; and
  initiating the specific action or operation with the application.

2. The method according to claim 1, further comprising switching screen mode from idle screen mode to active screen mode.

3. The method according to claim 2, wherein the idle screen mode uses less power than the active screen mode.

4. The method according to claim 1, further comprising displaying a graphical object on the touch screen that indicates a location of the one target area on the touch screen.

5. The method according to claim 1, wherein the start area is a physically distinguishable area of said screen.

6. The method according to claim 5, wherein the start area is a corner of the touch screen.

7. The method according to claim 1, wherein the one target area is a physically distinguishable area of said screen.

8. The method according to claim 7, wherein the one target area is a corner of said screen.

9. The method according to claim 1, wherein the application is one of a calendar application software, a messaging application software, a web browser application software, a contacts list application software, game application software, setting management application software, music player application software, a camera application software, communications settings application software, or a video recording application software.

10. A User Equipment (UE), comprising:
 a touch screen; and
 one or more processors configured to:
  display, on the touch screen, a plurality of target areas, wherein each of the plurality of target areas corresponds to a different application
  detect, using the touch screen, a slide gesture from a start area to one target area among the plurality of target areas, wherein the slide gesture is in a vertical, a horizontal, or a diagonal direction;
  while the touch screen is locked, in response to detecting that the slide gesture reaches to the one target area, display a graphical object on the touch screen that indicates a location of a sub-choice target area on the touch screen, wherein the sub-choice target area is associated with a sub-choice representing a specific action or operation within the application corresponding to the one target area;
  when the slide gesture releases on the target area:
   unlock the touch screen; and
   launch the application corresponding to the one target area;
  when the slide gesture continues to and releases on the sub-choice target area:
   unlock the touch screen;

launch the application corresponding to the one target area; and initiate the specific action or operation with the application.

11. The UE of claim 10, the one or more processors further configured to switch screen mode from idle screen mode to active screen mode.

12. The UE of claim 11, wherein the idle screen mode uses less power than the active screen mode.

13. The UE of claim 10, further comprising displaying a graphical object on the touch screen that indicates a location of the one target area on the touch screen.

14. The UE of claim 10, wherein the start area is a physically distinguishable area of said screen.

15. The UE of claim 14, wherein the start area is a corner of the touch screen.

16. The UE of claim 10, wherein the one target area is a physically distinguishable area of said screen.

17. The UE of claim 16, wherein the one target area is a corner of said screen.

18. The UE of claim 10, wherein the application is one of a calendar application software, a messaging application software, a web browser application software, a contacts list application software, game application software, setting management application software, music player application software, a camera application software, communications settings application software, or a video recording application software.

19. A non-transitory computer readable medium storing instructions to cause a processor to perform operations comprising:

displaying, on a touch screen of an electronic device, a plurality of target areas, wherein each of the plurality of target areas corresponds to a different application;

detecting, using the touch screen of the electronic device, a slide gesture from a start area to one target area among the plurality of target areas, wherein the slide gesture is in a vertical, a horizontal, or a diagonal direction;

while the touch screen is locked, in response to detecting that the slide gesture reaches to the one target area, displaying a graphical object on the touch screen that indicates a location of a sub-choice target area on the touch screen, wherein the sub-choice target area is associated with a sub-choice representing a specific action or operation within the application corresponding to the one target area;

when the slide gesture releases on the target area:
unlocking the touch screen; and
launching the application corresponding to the one target area;

when the slide gesture continues to and releases on the sub-choice target area:
unlocking the touch screen;
launching the application corresponding to the one target area; and
initiating the specific action or operation with the application.

20. The computer readable medium of claim 19, the instructions further comprising switching screen mode from idle screen mode to active screen mode.

21. The computer readable medium of claim 20, wherein the idle screen mode uses less power than the active screen mode.

22. The computer readable medium of claim 19, the instructions further comprising displaying a graphical object on the touch screen that indicates a location of the one target area on the touch screen.

23. The computer readable medium of claim 19, wherein the start area is a physically distinguishable area of said screen.

24. The computer readable medium of claim 23, wherein the start area is a corner of the touch screen.

25. The computer readable medium of claim 19, wherein the one target area is a physically distinguishable area of said screen.

26. The computer readable medium of claim 25, wherein the one target area is a corner of said screen.

27. The computer readable medium of claim 19, wherein the application is one of a calendar application software, a messaging application software, a web browser application software, a contacts list application software, game application software, setting management application software, music player application software, a camera application software, communications settings application software, or a video recording application software.

* * * * *

UNITED STATES PATENT AND TRADEMARK OFFICE
CERTIFICATE OF CORRECTION

| | | |
|---|---|---|
| PATENT NO. | : 10,437,449 B2 | Page 1 of 1 |
| APPLICATION NO. | : 14/804133 | |
| DATED | : October 8, 2019 | |
| INVENTOR(S) | : Karl-Anders Johansson | |

It is certified that error appears in the above-identified patent and that said Letters Patent is hereby corrected as shown below:

In the Specification

In Column 1, Line 5, delete "5" and insert -- 15 --, therefor.

Signed and Sealed this
Seventh Day of January, 2020

Andrei Iancu
*Director of the United States Patent and Trademark Office*